(12) United States Patent (10) Patent No.: US 8,559,995 B2
Watanabe et al. (45) Date of Patent: Oct. 15, 2013

(54) POWER CONTROL APPARATUS FOR WIRELESS TELECOMMUNICATION SYSTEM

(75) Inventors: Teruyoshi Watanabe, Kawasaki (JP); Hajime Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1087 days.

(21) Appl. No.: 11/431,884

(22) Filed: May 10, 2006

(65) Prior Publication Data

US 2007/0197252 A1 Aug. 23, 2007

(30) Foreign Application Priority Data

Feb. 21, 2006 (JP) .................................. 2006-044441

(51) Int. Cl.
H04B 7/00 (2006.01)
H04B 17/00 (2006.01)
H04B 7/216 (2006.01)

(52) U.S. Cl.
USPC ........ 455/522; 455/67.11; 370/318; 370/320; 370/335

(58) Field of Classification Search
USPC ...................... 455/522, 67.11, 69, 13.4, 12.1; 370/318, 320, 335
See application file for complete search history.

(56) References Cited

U.S. PATENT DOCUMENTS

| | | | | |
|---|---|---|---|---|
| 7,110,786 B2 * | 9/2006 | Moulsley et al. | ............. | 455/522 |
| 7,218,949 B2 * | 5/2007 | Koo et al. | ...................... | 455/522 |
| 7,453,862 B2 * | 11/2008 | Adjakple et al. | ............. | 370/345 |
| 7,593,486 B2 * | 9/2009 | Jeong et al. | ................... | 375/324 |
| 7,616,677 B2 * | 11/2009 | Koo et al. | ...................... | 375/141 |
| 2002/0028691 A1 | 3/2002 | Moulsley et al. | | |
| 2002/0058524 A1 * | 5/2002 | Arimitsu | ........................ | 455/522 |
| 2003/0040320 A1 | 2/2003 | Lucidarme et al. | | |
| 2003/0119452 A1 | 6/2003 | Kim et al. | | |
| 2003/0232622 A1 | 12/2003 | Seo et al. | | |
| 2004/0043783 A1 * | 3/2004 | Anderson | ...................... | 455/522 |
| 2004/0106425 A1 * | 6/2004 | Koo et al. | ...................... | 455/522 |
| 2004/0120288 A1 * | 6/2004 | Adjakple et al. | .............. | 370/333 |
| 2005/0083999 A1 * | 4/2005 | Koo et al. | ...................... | 375/148 |
| 2005/0105483 A1 | 5/2005 | Uehara et al. | | |
| 2006/0003789 A1 * | 1/2006 | Murata et al. | .................. | 455/522 |

FOREIGN PATENT DOCUMENTS

| | | |
|---|---|---|
| CN | 1394393 | 1/2003 |
| EP | 1 508 978 | 2/2005 |
| JP | 2003-188818 | 7/2003 |
| JP | 2003-527010 | 9/2003 |
| JP | 2003-298509 | 10/2003 |

(Continued)

OTHER PUBLICATIONS

3 GPP TS 25.211 V6.7.0 http://www.3gpp.org/ftp/Specs/html-info/25-series.htm Dec. 2005.

(Continued)

*Primary Examiner* — Matthew Sams
(74) *Attorney, Agent, or Firm* — Katten Muchin Rosenman LLP

(57) ABSTRACT

In a wireless telecommunication system, a power control apparatus performs a data telecommunication with a control target apparatus and receives data arrival acknowledgement information transmitted therefrom in a data retransmission layer. Then it judges a reception quality of the control target apparatus by using the received data arrival acknowledgement information and changes a target power quality which is set up for the control target apparatus based on a result of the judgment. And it notifies the control target apparatus of the changed target power quality.

4 Claims, 17 Drawing Sheets

(56) References Cited

FOREIGN PATENT DOCUMENTS

| | | |
|---|---|---|
| JP | 2004-104669 | 4/2004 |
| JP | 2004-187247 | 7/2004 |
| JP | 2005-525739 | 8/2005 |
| WO | 03/096553 | 11/2003 |
| WO | 2004/091114 | 10/2004 |

OTHER PUBLICATIONS

3 GPP TS 25.427 V6.5.0 http://www.3gpp.org/ftp/Specs/html-info/25-series.htm Dec. 2005.
3 GPP TS 25.214 V6.7.1 http://www.3gpp.org/ftp/Specs/html-info/25-series.htm Dec. 2005.
3 Gpp Ts 25.331 V6.8.0 http://www.3gpp.org/ftp/Specs/html-info/25-series.htm Dec. 2005.
3 GPP TS 25.433 V6.8.0 http://www.3gpp.org/ftp/Specs/html-info/25-series.htm Dec. 2005.
European Search Report dated Apr. 26, 2007, from the corresponding European Application.
Decision of Rejection dated Mar. 16, 2010, from the corresponding Japanese Application.
Chinese First Office Action dated Dec. 25, 2009, from the corresponding Chinese Application.
Notice of Rejection Ground dated Dec. 22, 2009, from the corresponding Japanese Application.

* cited by examiner

| Information Element/Group name | Need | Multi | Type and reference | Semantics description |
|---|---|---|---|---|
| Primary CPICH Tx Power | MP | | Integer(-10..50) | Power in dBm. |

F I G. 1 B

| Information Element/Group name | Need | Multi | Type and reference | Semantics description |
|---|---|---|---|---|
| Constant value | MP | | Integer (−35..−10) | In dB |

FIG. 1C

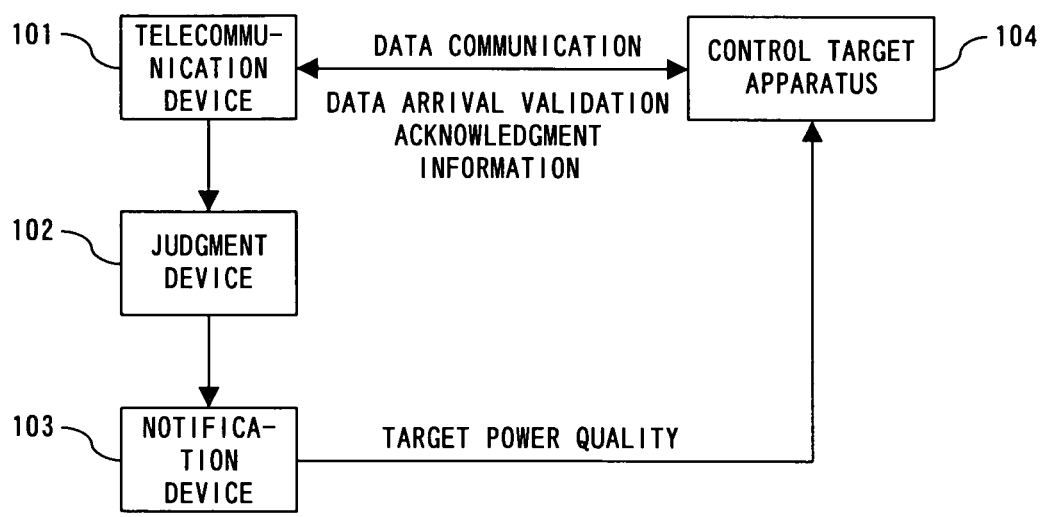
F I G. 2 A

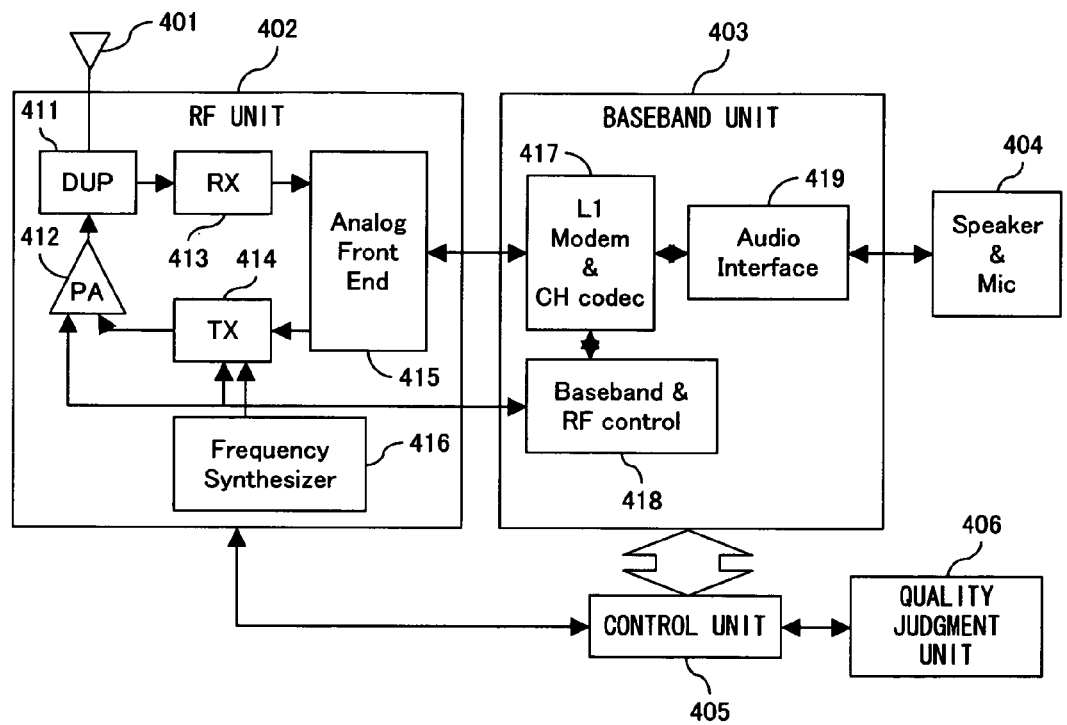
F I G. 4

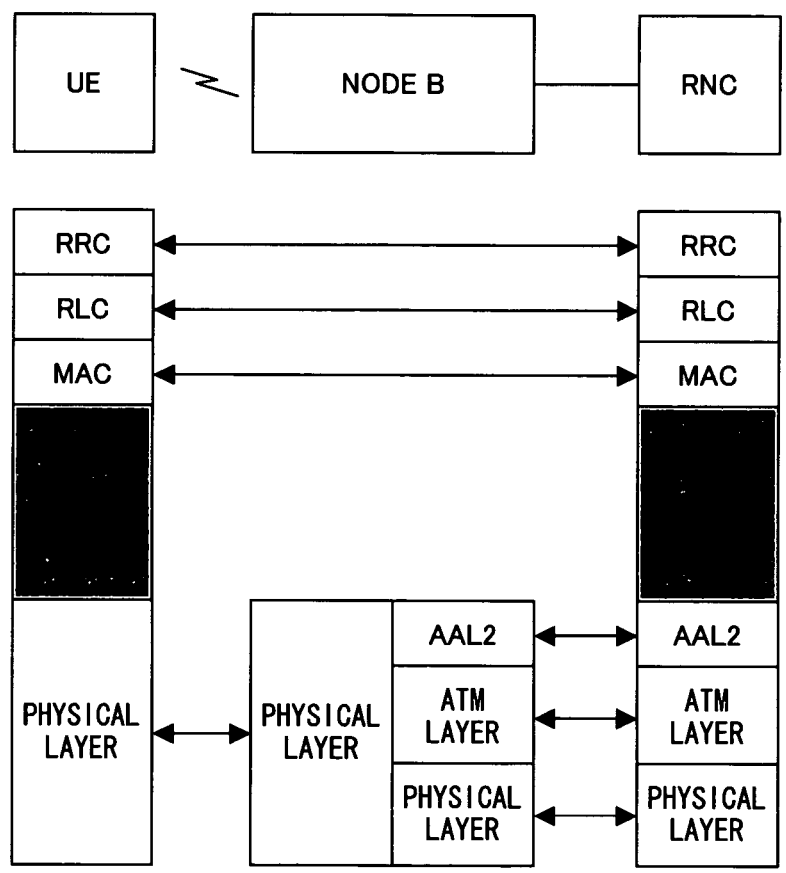
F I G. 5

| Parameter | Need | Type and Reference | Semantics description |
|---|---|---|---|
| JUDGMENT VALUE A | OP | Integer(0. 0.001.. 100) | In % |
| JUDGMENT VALUE B | OP | Integer(0. 0.001.. 100) | In % |
| NUMBER OF TIMES OF JUDGMENTS C | OP | Integer(0..10000) | IN THE NUMBER OF TIMES |
| JUDGMENT PERIOD D | OP | Integer(0. 0.001.. 100) | In (sec) |
| JUDGMENT PERIOD E | OP | Integer(0. 0.001.. 100) | In (sec) |
| THE CURRENT RECEPTION QUALITY ACHIEVEMENT RATIO F (%) | OP | Integer(0. 0.001..100) | In % |
| THE PREVIOUS RECEPTION QUALITY ACHIEVEMENT RATIO G (%) | OP | Integer(0. 0.001..100) | In % |
| JADGMENT VALUE H (%) | OP | Integer(0. 0.001..100) | In % |
| JUDGMENT VALUE X | OP | Integer(0. 0.001..100) | In |
| JUDGMENT VALUE Y | OP | Integer(0. 0.001..100) | In |
| JUDGMENT VALUE Z | OP | Integer(0. 0.001..100) | In |

FIG. 6

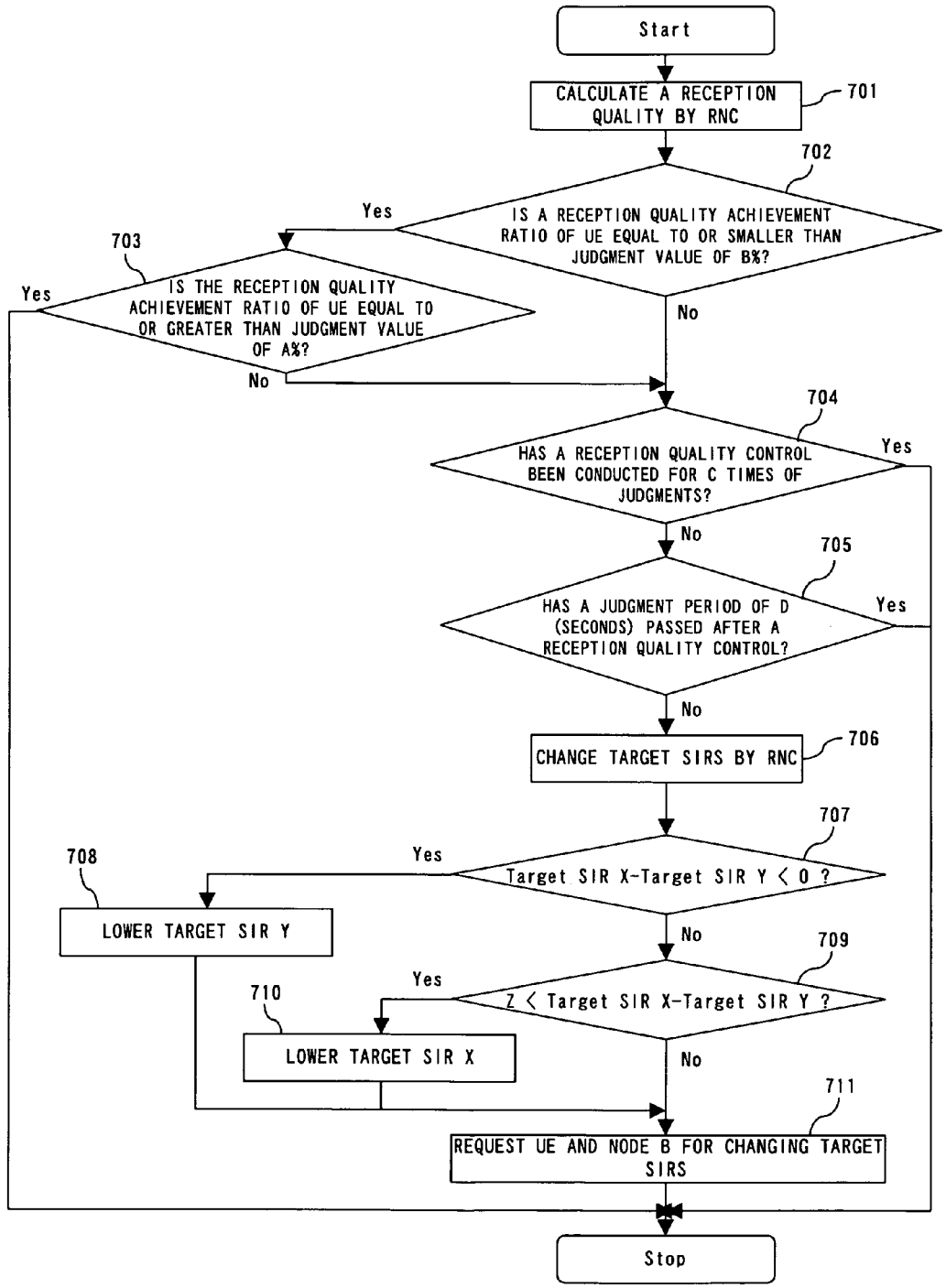
F I G. 7

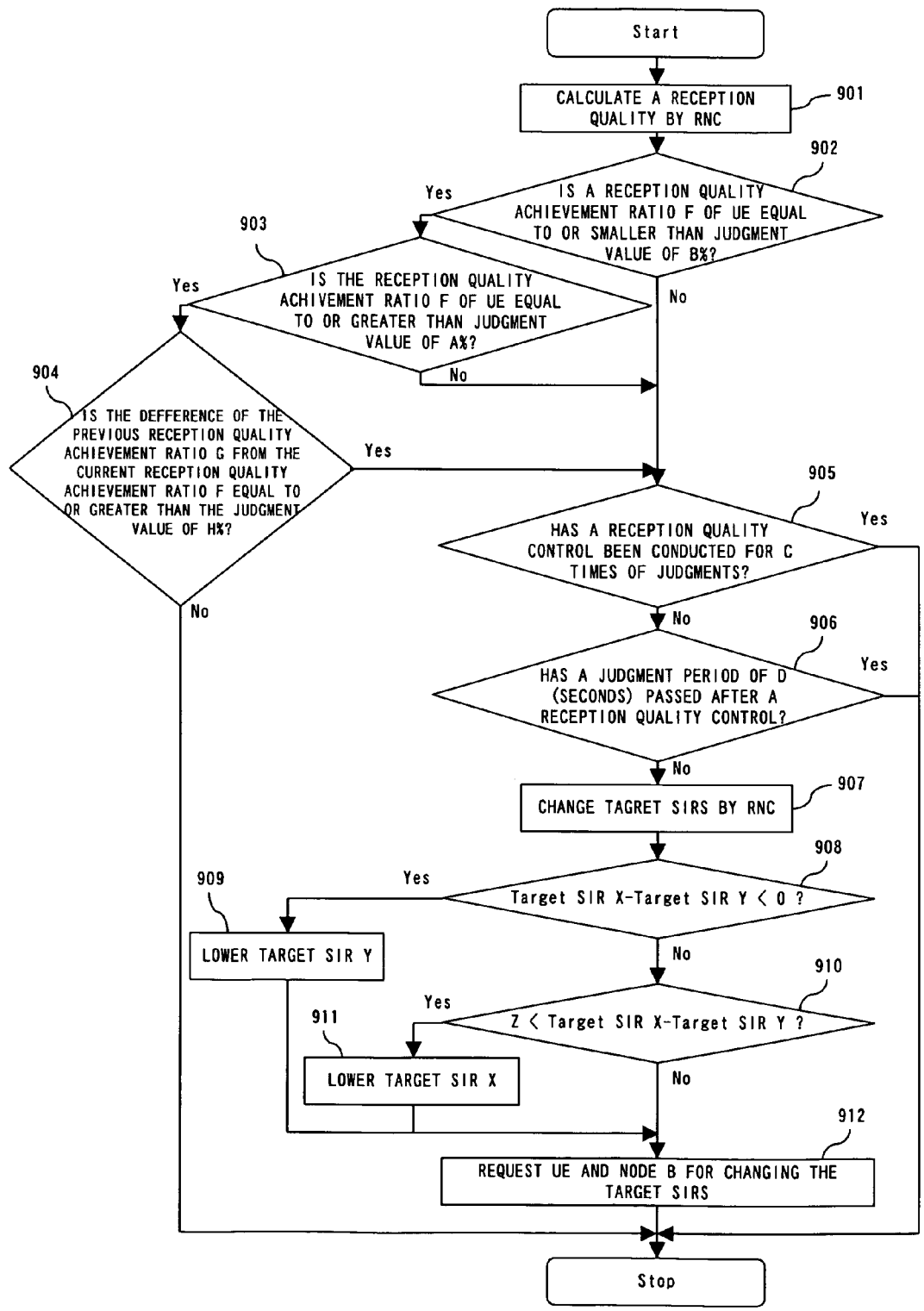
F I G. 9

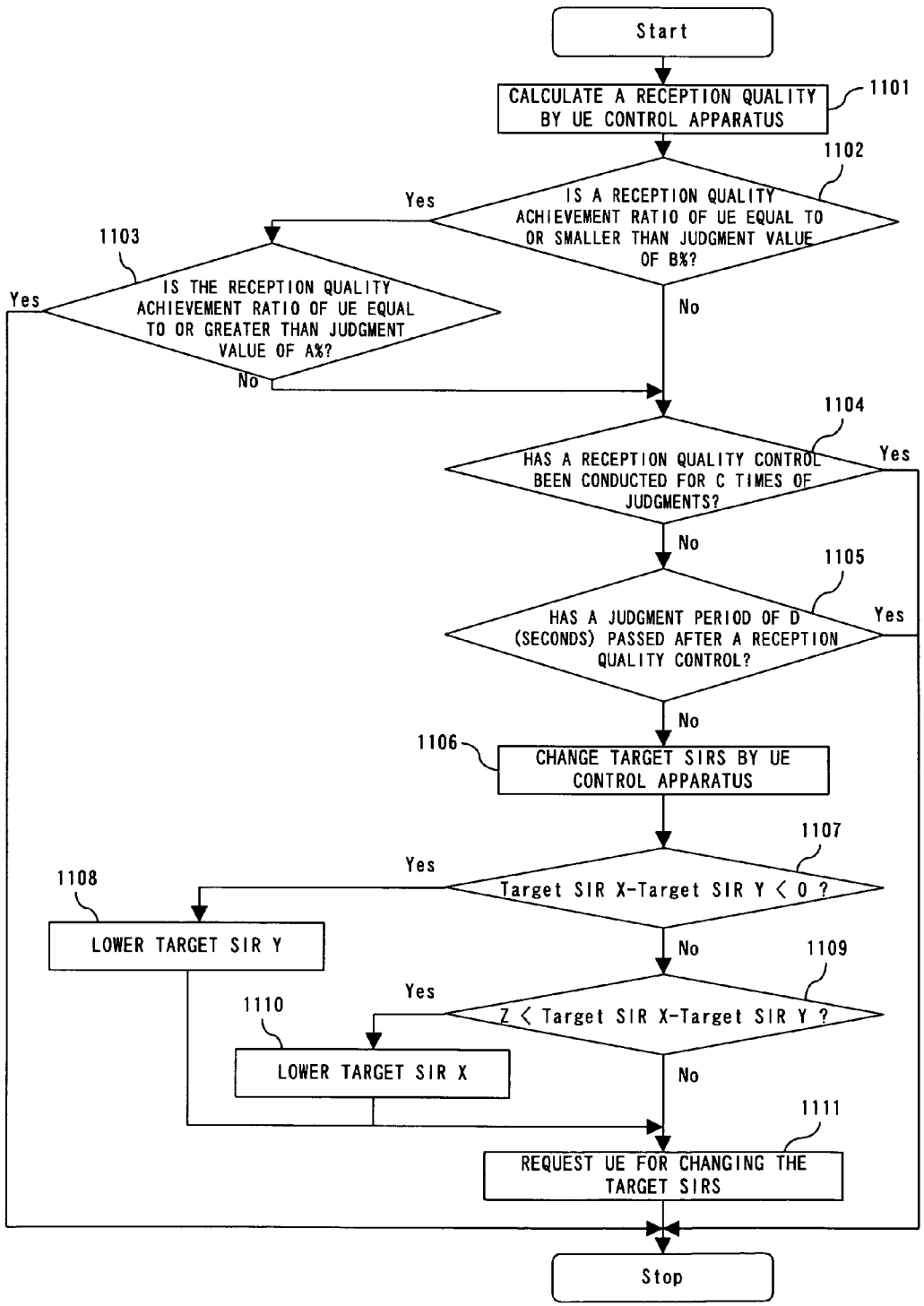
F I G. 1 1

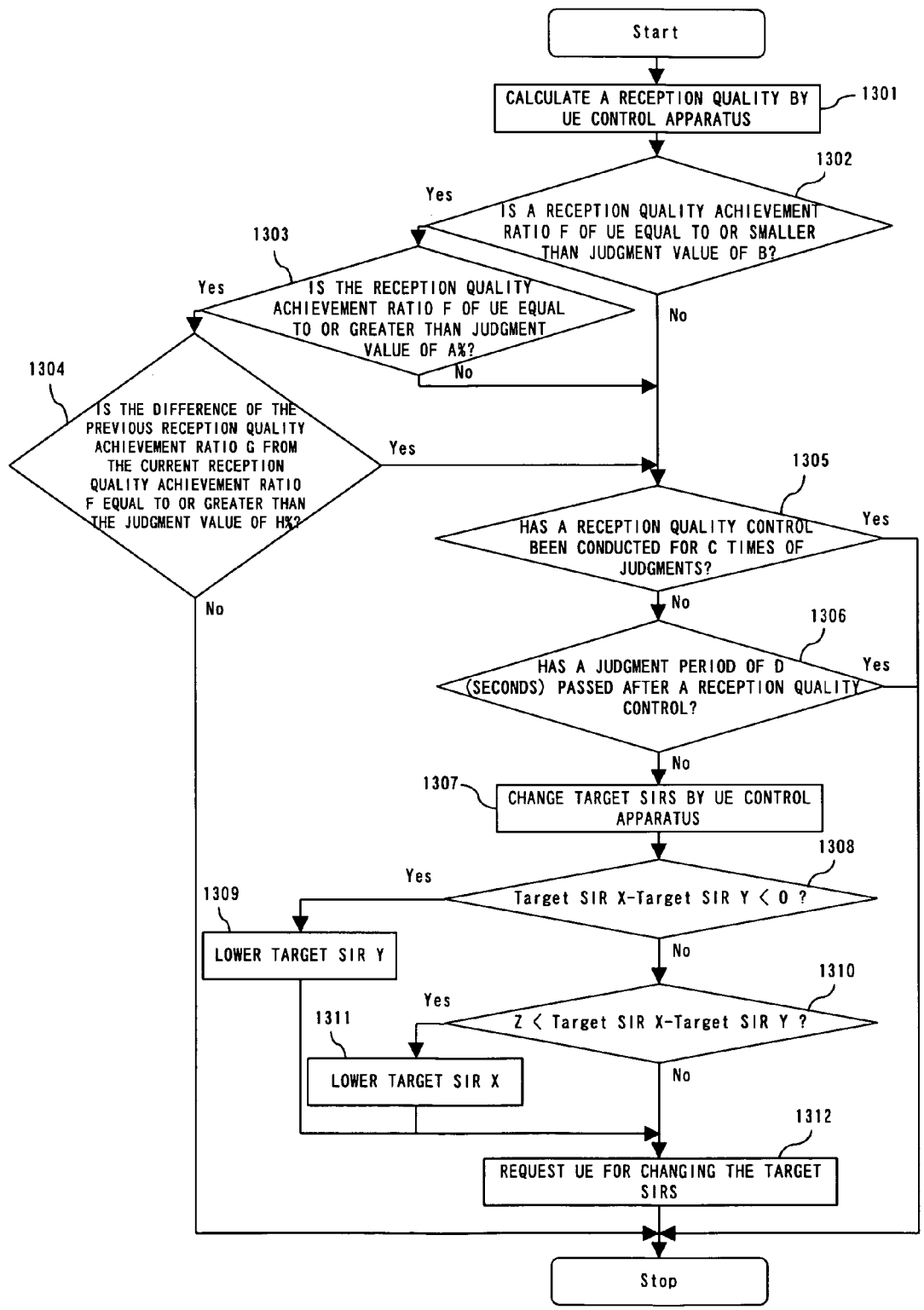
F I G. 1 3

POWER CONTROL APPARATUS FOR WIRELESS TELECOMMUNICATION SYSTEM

BACKGROUND OF THE INVENTION

1. Field of the Invention

The present invention relates to a power control for a wireless telecommunication system and in particular to an apparatus for performing a power control among a mobile station, a base station apparatus and a base station control apparatus which is carried out in a mobile telecommunication system employing Wideband Code Division Multiple Access (W-CDMA).

2. Description of the Related Art

With respect to a power control method for the W-CDMA system, the 3GPP ($3^{rd}$ Generation Partnership Project) standard specifies as the following paragraphs (1) through (3):

(1) Open Loop Power Control (Refer to the Below Noted Non-Patent Document 1):

Non-Patent document 1: 3GPP TS25.331; [online], [searched on Jan. 6, 2006], Internet <URL: http://www.3gpp.org/ftp/Specs/html-info/25-series.htm>

The open loop power control is applied to a common channel (Preamble RACH (Random Access Channel)/Preamble CPCH (Control Physical Channel)).

FIG. 1A shows an operation sequence of an initial transmission power control at a mobile station (UE) at the time of transmitting a Preamble RACH. First, a base station apparatus (Node B) performs a PCCPCH (Primary Common Control Physical Channel) transmission or a BCH (Broadcast Channel) transmission to a UE and notifies it of a cell transmission power and a pilot channel power by using a System Information Block (procedure 11).

The UE starts a call operation (procedure 12) and calculates a Path Loss with the base station of a transmission destination by subtracting a power received at the UE itself (i.e., CPICH Ec/Io or RSCP (Received Signal Code Power)) from a cell transmission power (i.e., CPICH (Common Pilot Channel) transmission power) (procedure 13). And it determines a transmission power of the UE itself with the Path Loss being considered and performs a Preamble RACH transmission by the transmission power (procedure 14).

Then a base station control apparatus (Radio Network Controller) receives a report (i.e., Measurement Results on RACH) by RACH and determines the maximum transmission power for a common channel (i.e., FACH (Forward Access Channel)) which is used when transmitting downlink control information, based on a state of the reception power of the UE.

In the case of carrying out an Open Loop Power Control, "Primary CPICH Tx power" and "Constant value" within a System Information Block are used. The Primary CPICH Tx power and Constant value are defined as shown by FIGS. 1B and 1C.

A Preamble RACH transmission power (Preamble Initial Power) transmitted from the UE is provided by the following expression (1):

$$\text{Preamble\_Initial\_Power} = (\text{Primary CPICH Tx power}) - (\text{CPICH\_RSCP}) + (\text{UL interference}) + (\text{Constant Value}) \quad (1)$$

(2) Inner Loop Power Control (Refer to the Below Noted Non-Patent Documents 2 and 3):

Non-patent document 2: 3GPP TS25.211; [online], [searched on Jan. 6, 2006], Internet <URL: http://www.3gpp.org/ftp/Specs/html-info/25-series.htm>

Non-patent document 3: 3GPP TS25.214; [online], [searched on Jan. 6, 2006], Internet <URL: http://www.3gpp.org/ftp/specs/html-info/25-series.htm>

The Inner Loop Power Control is a power control for an L1 line (a physical channel: DPCH (Dedicated Physical Channel)), which operates independently in a DL (downlink) and a UL (uplink). It basically is operable in a single slot synchronism.

A Target SIR, that is, a target value of a Signal to Interference Ratio is retained by the Node B and UE respectively, and whose target value is basically changeable for each RAB (Radio Access Bearer) category. The target value is defined by station data at the RNC and set up at the time of a call establishment. And the Target SIR is controllable and/or updatable by a later described Outer Loop Power Control.

In the Inner Loop Power Control, an increase or decrease of a transmission power is specified by a transmission power control (TPC) bit so that an SIR comes close to the Target SIR between corresponding apparatuses (i.e., the node B and UE). A TPC bit, however, is capable of specifying only an increase or decrease. A control range, et cetera, of the TPC is specified at the time of a call establishment by using a RRC (Radio Resource Control) message.

(3) Outer Loop Power Control (Refer to the Below Noted Non-Patent Documents 4 and 5):

Non-patent document 4: 3GPP TS25.427; [online], [searched on Jan. 6, 2006], Internet <URL: http://www.3gpp.org/ftp/Specs/html-info/25-series.htm>

Non-patent document 5: 3GPP TS25.433; [online], [searched on Jan. 6, 2006], Internet <URL: http://www.3gpp.org/ftp/Specs/html-info/25-series.htm>

In the Outer Loop Power Control, a Target SIR is changed so that a reception quality of a line (BLER (Block Error Rate)/BER (Bit Error Rate)) comes close to a required reception quality. In this case, a control is carried out by measuring the respective line qualities of the UL and DL at the RNC and UE, respectively.

A reception quality is not always proportionate with a reception SIR value, and the former is sometimes bad even if the latter is good. Accordingly, a line quality is measured by means of the Outer Loop Power Control and the Target SIRs are changed so as to come close to the required reception quality.

The UE observes a quality (i.e., BLER/BER) after synthesizing the maximum ratio and periodically changes the Target SIRs of the Outer Loop Power Control. The change cycle is settable for each RAB.

The RNC observes a quality (i.e., CRC (Cyclic Redundancy Check)/BLER/BER) after applying a selective combined diversity process to a reception signal and periodically changes the Target SIRs of the Outer Loop Power Control. Since the control is carried out by an SRNC (Serving Radio Network Controller), it is settable in both of the frame protocols of Iur/Iub frames.

FIG. 1D shows an operation sequence of the above described Inner Loop Power Control and Outer Loop Power Control.

As a call is established among the UE, Node B and RNC (procedure 21), an individual channel signal is transmitted and received between the Node B and UE (procedure 22). The respective apparatuses of the UE and Node B measure SIRs respectively and compare the measured SIRs with the Target SIRs (procedures 23 and 24).

Then, each apparatus instructs the opposite apparatus for an increase or decrease of the transmission power by using a TPC bit so that the SIR comes close to the Target SIR (procedure 25) and the opposite apparatus changes the transmission powers compliant to the instruction, followed by transmitting data (procedure 26).

The Node B calculates CRC of the data received from the UE and calculates a Transport CH BER (procedure 27), followed by reporting the obtained CRC/BER to the RNC (procedure 28).

The RNC calculates the reception quality from the received CRC by the following expression and changes the Target SIRs so that the reception quality comes close to the required reception quality (procedure 29):

Reception quality=(the number of unacceptable CRC results within a predetermined period)/(the number of samples within the predetermined period) (2)

Then it notifies the Node B of a change instruction (procedure 30).

The Node B changes the Target SIRs according to the instruction (procedure 31), and carries out an Inner Loop Power Control between the Node B and UE once again based on the changed Target SIR for changing the transmission powers (procedures 32 and 33).

The below noted patent document 1 relates to a transmission power control for an information notification service using a common channel (CBS (Cell Broadcast Service)/MBMS (Multimedia Broadcast Multicast Service)). This system, requiring execution of a power control relating to the common channel, obtains common channel power control-use information from a UE (as the target of MBMS/CBS) and reflects it to the common channel. In order to collect the control information, an RRC message is used.

Patent document 1: Japanese Patent Application Publication No. 2003-188818

In the conventional power control, an independent power control is carried out between the UE and Node B or between the Node B and RNC as described above. In this case, a power control is not carried out between the UE and RNC where direct telecommunication takes place, although the power is appropriately set for each section, and therefore the powers for both sections cannot be set to appropriate values simultaneously.

SUMMARY OF THE INVENTION

An object of the present invention is to carry out a power control between a UE and an RNC for a wireless mobile telecommunication system.

A power control apparatus according to the present invention, comprising a telecommunication device, a judgment device and a notification device, controls a power of a control target apparatus for use in a wireless mobile telecommunication system.

The telecommunication device performs data telecommunication with the control target apparatus and receives data arrival acknowledgement information transmitted therefrom in a data retransmission layer. The judgment device judges a reception quality of the control target apparatus by using the received data arrival acknowledgement information and changes a target power quality which is set up for the control target apparatus based on a result of the judgment. The notification device notifies the control target apparatus of the changed target power quality.

BRIEF DESCRIPTION OF THE DRAWINGS

FIG. 1B shows the definition of Primary CPICH Tx power;
FIG. 1C shows the definition of Constant value;
FIG. 2A is a diagram showing the principle of a power control apparatus according to the present invention;
FIG. 4 is a configuration diagram of a mobile station;
FIG. 5 shows a first protocol structure;
FIG. 6 shows judgment parameters;
FIG. 7 is a flow chart of a first quality judgment process;
FIG. 9 is a flowchart of a third quality judgment process;
FIG. 11 is a flow chart of a fourth quality judgment process;
FIG. 13 is a flow chart of a sixth quality judgment process.

DESCRIPTION OF THE PREFERRED EMBODIMENTS

The following is a detailed description of the preferred embodiment of the present invention by referring to the accompanying drawings.

FIG. 2A is a diagram showing the principle of a power control apparatus according to the present invention. The power control apparatus shown by FIG. 2A, comprising a telecommunication device 101, a judgment device 102 and a notification device 103, controls a power of an control target apparatus 104 used for a wireless mobile telecommunication system.

The telecommunication device 101 carries out data communication with control target apparatus 104 and receives data arrival acknowledgement information transmitted therefrom in a data retransmission layer. The judgment device 102 judges a reception quality of the control target apparatus 104 by using the received data arrival acknowledgement information and changes a target power quality which is set up for the control target apparatus 104 based on the judgment result. The notification device 103 notifies the control target apparatus 104 of the changed target power quality.

The control target apparatus 104 generates data arrival acknowledgement information for indicating the fact of receiving data transmitted from the telecommunication device 101 and transmits it to the telecommunication device 101 by using a data retransmission layer. The telecommunication device 101 transfers the received data arrival acknowledgement information to the judgment device 102 which then judges whether or not a reception quality of the control target apparatus 104 is within a predetermined range by using the data arrival acknowledgement information and, if it is on the outside of the predetermined range, changes the target power quality of the control target apparatus 104. The notification device 103 notifies the control target apparatus 104 of the changed target power quality, while the control target apparatus 104 changes the powers so as to accomplish the notified target power quality.

Figure 1A:
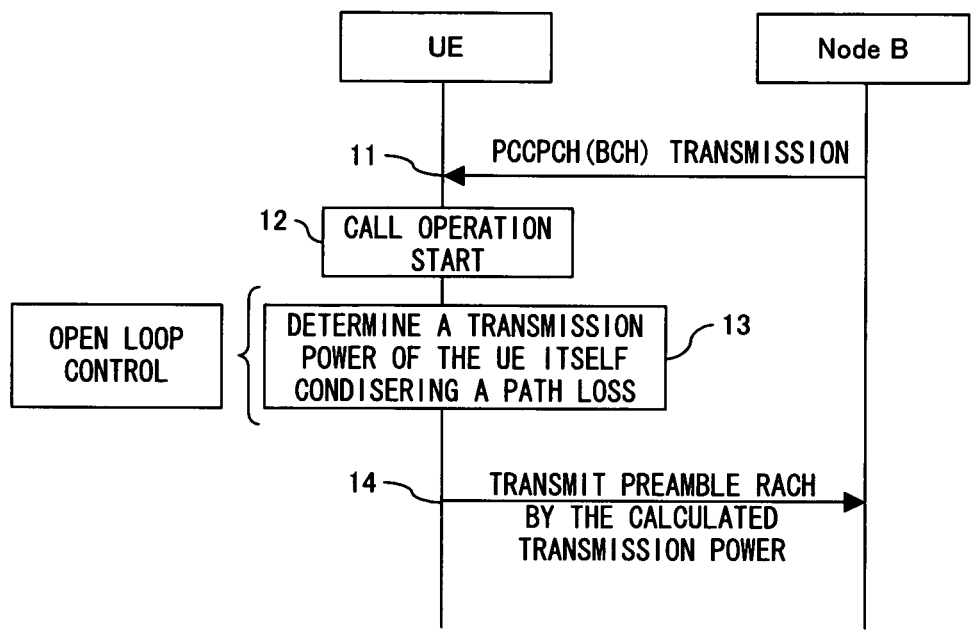
FIG. 1A shows a conventional Open Loop Power Control.
Figure 1D:
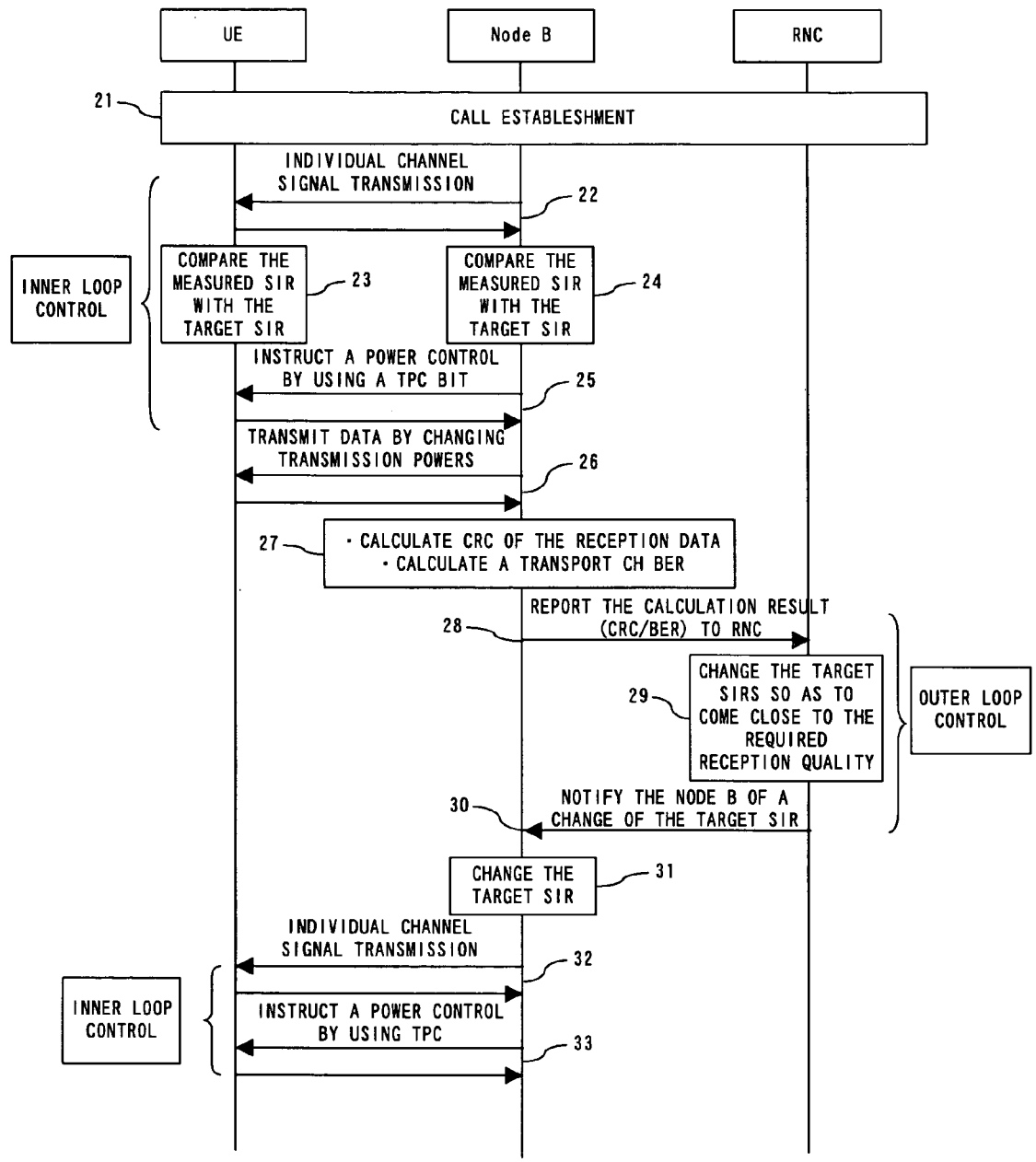
FIG. 1D shows a conventional Inner Loop Power Control/Outer Loop Power Control.
Figure 2B:
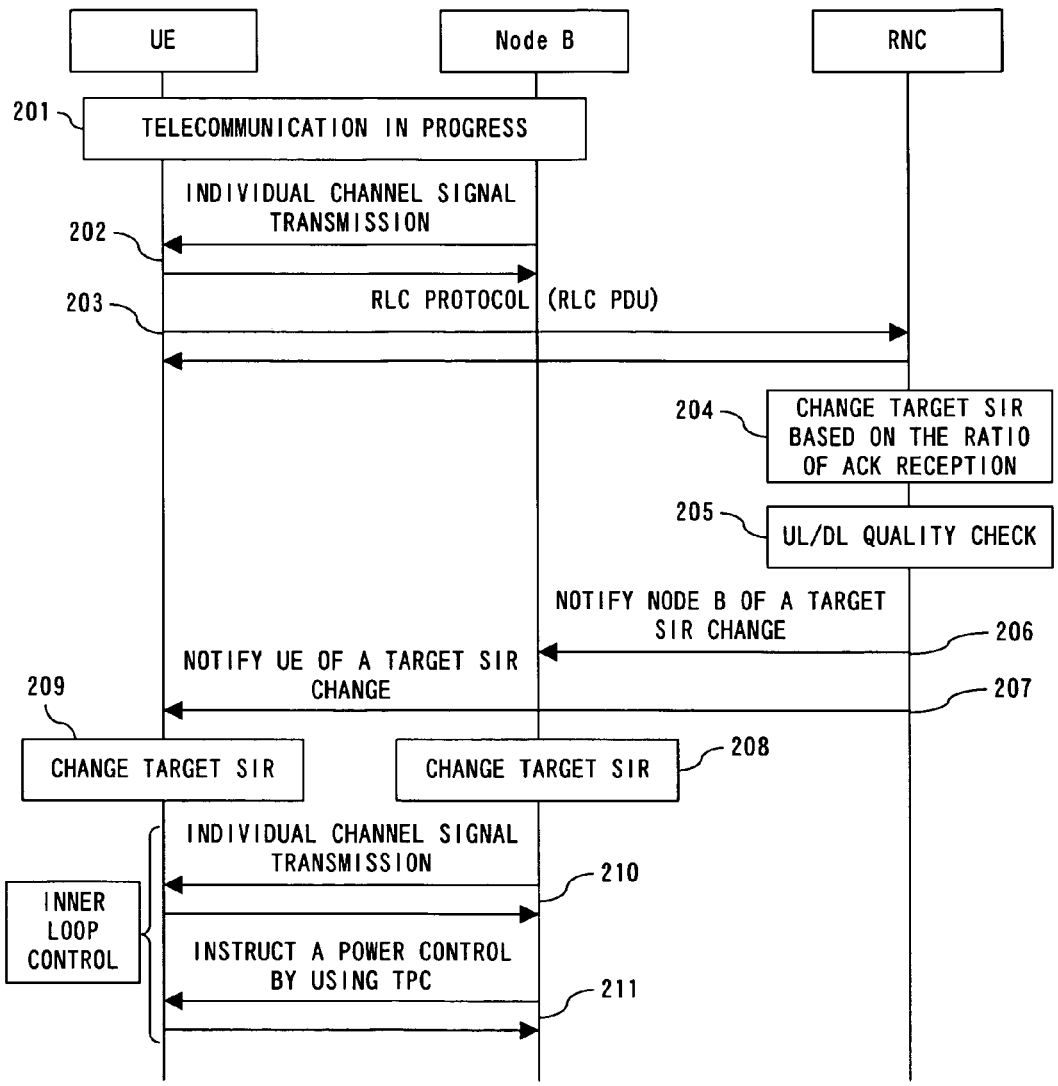
FIG. 2B shows a power control according to the present invention.
Figure 10:
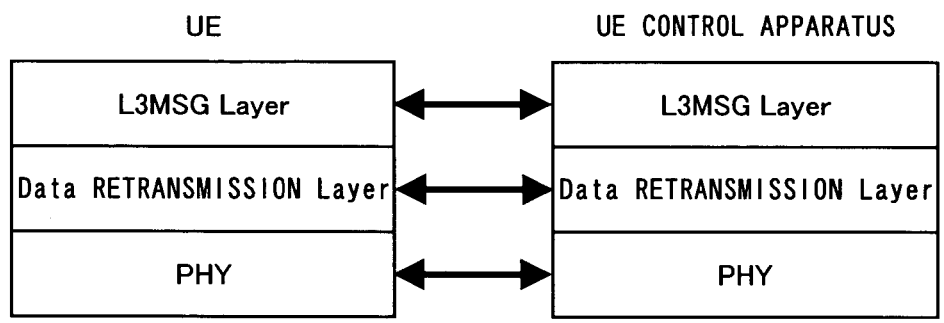
FIG. 10 shows a second protocol structure.

The power control apparatus for example corresponds to an RNC shown in FIG. 2B or a UE control apparatus shown in FIG. 10, and the control target apparatus 104 for example corresponds to a UE shown in FIG. 2B or a UE shown in FIG. 10. The telecommunication device 101 and notification device 103 for example corresponds to a later described interface unit 302 shown in FIG. 3 and the judgment device 102 for example corresponds to a quality judgment unit 383 shown in FIG. 3.

Conversely to the above corresponding relationship, the power control apparatus may possibly correspond to the UE shown in FIG. 2B or the UE shown in FIG. 10, while the control target apparatus 104 may possibly correspond to the RNC shown in FIG. 2B or the UE control apparatus shown in FIG. 10. In this case, both the telecommunication device 101 and notification device 103 for example correspond to the combination of an antenna 401, an RF unit 402 and a baseband unit 403 which are described later, while the judgment device 102 for example corresponds to a quality judgment unit 406 shown in FIG. 4.

According to the present invention, a power control apparatus such as an RNC is capable of judging a reception quality of a control target apparatus such as a UE based on data arrival acknowledgement information received from the control target apparatus by way of the data retransmission layer and directly controlling a power thereof. Therefore, this enables a power control between the UE and RNC aiming at a convenience of the entire system, and accordingly an integrated control of a required transmission power/reception power for the UE and RNC.

The present embodiment is configured to carry out a power control based on the number of receptions of ACK (Acknowledgement) of RLC PDU (Radio Link Control Protocol Data Unit) which are directly transmitted from the UE to RNC. The RNC obtains a reception quality from the number of receptions of ACK of the RLC PDU received from the UE and calculates the difference from the required reception quality.

And it changes Target SIRs so that the reception quality comes close to the required reception quality and notifies a Node B and the UE, respectively, of the change, thereby directly carrying out the power control.

FIG. 2B shows an operation sequence of such a power control. First, telecommunication takes place between the UE and Node B (procedure 201) and an individual channel signal is exchanged (procedure 202). Then the UE and RNC perform telecommunication by an RLC protocol, and the UE periodically transmits RLC PDU including ACK information to the RNC (procedure 203).

The RNC checks a presence or absence of ACK in each PDU, calculates a ratio (i.e., an ACK reception ratio) of the number of ACKs (i.e., the number of ACK receptions) to the number of PDUs (i.e., the number of samples) and calculates a reception quality based on the ACK reception ratio (procedure 204). It then compares the reception quality with the required reception quality and, if there is a difference between them, changes the Target SIR for the UE.

Next, it sets a Target SIR for the Node B by an Outer Loop Power Control and checks a Target SIR for the UE and that for the Node B (procedure 205), which is followed by notifying the Node B of the Target SIR therefor (procedure 206) and notifying the UE of the Target SIR therefor (procedure 207).

The Node B and UE respectively change the Target SIRs for the apparatuses themselves to the values notified from the RNC (procedures 208 and 209), followed by performing an Inner Loop Power Control between the Node B and UE based on the changed Target SIRs to change the transmission powers (procedures 210 and 211).

However, in the case of an improvement of a reception quality being not recognized despite the RNC issues power control instructions continuously for a prescribed number of times, the UE is regarded to have failed and a power control thereafter is not carried out.

Such a power control enables the RNC to carry out a power control for the UE and Node B based on data arrival acknowledgement information (ACK) directly reported from the UE to RNC. And a use of the RLC layer enables the UE to directly transmit, to the RNC, a parameter which is detectable by the RNC relating to a reception power state of the UE.

Furthermore, a direct notification of a power state from the RNC to the UE and Node B enables a power control aiming at the convenience of the entire system and an integrated control of a required transmission power/reception power of the UE and Node B.

Figure 3:
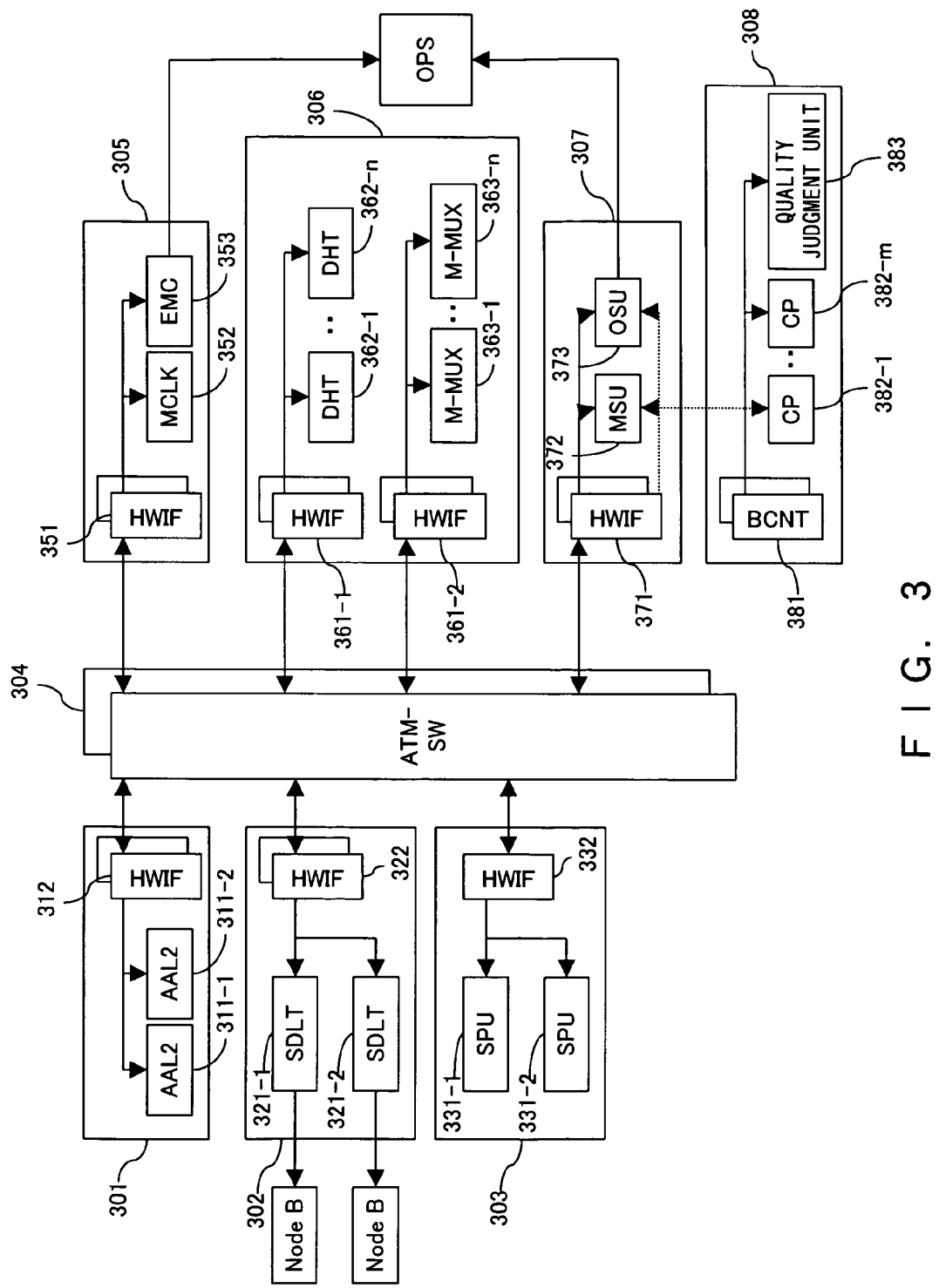
FIG. 3 is a configuration diagram of a base station control apparatus.

FIG. 3 exemplifies a configuration of the RNC shown in FIG. 2B. The RNC, comprising process units 301, 303 and 306, an interface unit 302, a switch unit 304 (ATM-SW), control units 305 and 308, and a termination unit 307, controls a plurality of Node Bs.

The process unit 301 includes AAL2 (ATM Adaptation Layer 2) process units 311-1, 311-2, and a transmission path interface unit 312 (HWIF). The AAL2 process units 311-1 and 311-2 perform multiplexing/de-multiplexing processing of the AAL2.

The interface unit 302 includes transmission path interfaces 321-1 (SDLT), 321-2 (SDLT) and 322 (HWIF). The transmission path interfaces 321-1 and 321-2 perform a termination of the Iub line between the Node B and RNC.

The process unit 303 includes packet data process units 331-1 (SPU) and 331-2 (SPU), and a transmission path interface 332 (HWIF). The packet data process units 331-1 and 331-2 process packet data.

The switch unit 304 performs switching for an ATM (Asynchronous Transfer Mode).

The control unit 305 includes a transmission path interface unit 351 (HWIF), a wireless frame clock generation unit 352 (MCLK) and an emergency control unit 353 (EMC). The wireless frame clock generation unit 352 generates an internal apparatus reference clock signal, while the emergency control unit 353 performs a monitor control for an abnormal apparatus state.

The process unit 306 includes transmission path interfaces 361-1 (HWIF) and 361-2 (HWIF), diversity handover trunk units 362-1 (DHT) through 362-n (DHT), and MAC (Media Access Control) multiplexing/de-multiplexing units 363-1 (M-MUX) through 363-n (M-MUX). The diversity hand over trunk units 362-1 through 362-n perform diversity handover processing, while the MAC multiplexing/de-multiplexing units 363-1 through 363-n perform MAC layer multiplexing/de-multiplexing processing for a wireless line.

The termination unit 307, comprising a transmission path interface unit 371 (HWIF), a mobile station opposite signal termination unit 372 (MSU) and an OPS (Operation System) opposite signal termination unit 373 (OSU), terminates a control signal of a call processing, et cetera.

The control unit 308 includes a bus control unit 381 (BCONT), call processing control units 382-1 (CP) through 382-m (CP) and a quality judgment unit 383. The call processing control units 382-1 through 382-m perform a call establishment control, a mobility management, et cetera.

The quality judgment unit 383 calculates a reception quality from the information of RLC PDU and compares it with the required reception quality. Here, if the reception quality is inferior, it instructs the UE and Node B to raise the Target SIRs in order to improve the reception quality. If the reception quality is better than the required reception quality, it instructs the UE and Node B to lower the Target SIRs in order to reduce the power consumptions.

The function of the quality judgment unit 383 can be implemented either by hardware or software. In the case of implementing by software, the quality judgment unit 383 includes a CPU (Central Processing Unit) and a memory, and executes a program, thereby judging a reception quality.

FIG. 4 exemplifies a configuration of the UE shown in FIG. 2B. The UE comprises an antenna 401, an RF (Radio Frequency) unit 402, a baseband unit 403, an audio input/output unit 404 (i.e., a speaker and a microphone), a control unit 405 and a quality judgment unit 406.

The RF unit 402 includes a duplexer 411 (DUP), a power amplifier 412 (PA), a receiver 413 (RX), a transmitter 414 (TX), a conversion unit 415 (Analog Front End) and a frequency synthesizer 416.

The baseband unit 403 includes a signal process unit 417 (L1 Modem & CH codec), a control unit 418 (Baseband & RF control) and an audio interface 419. The audio input/output unit 404 includes a speaker and a microphone.

A signal transmitted from the Node B is received at the antenna 401 and transferred to the baseband unit 403 by way of the duplexer 411, receiver 413 and conversion unit 415. In this event, the receiver 413 detects a reception signal, the conversion unit 415 performs an analog/digital (A/D) conversion, and the baseband unit 403 performs a baseband signal processing such as despreading the reception signal of W-CDMA system, and outputs an audio signal from the audio interface 419 to the audio input/output unit 404.

The audio signal from the audio input/output unit 404 is input to the audio interface 419 and is transferred as a transmission signal by way of the baseband unit 403, conversion unit 415 and transmitter 414. Then, it is amplified by the power amplifier 412, followed by being transmitted to a BTS from the antenna 401 by way of the duplexer 411. In this event, the baseband unit 403 performs a baseband signal processing such as spreading the transmission signal of W-CDMA system, the conversion unit 415 performs a digital/analog (D/A) conversion, and the transmitter 414 performs a conversion into an RF signal by using an output of the frequency synthesizer 416.

The control unit 405 performs RF channel management, quality control, mobility management, etcetera, and also carries out a power control such as setup/change of Target SIRs, change of transmission powers. The function of the quality judgment unit 406 is described later.

FIG. 5 exemplifies a protocol structure in the case of carrying out a power control shown in FIG. 2B among the UE, Node B and RNC. In this protocol structure, there are MAC layer, RLC layer and RRC layer as the upper layers of a physical layer, among which the RLC layer corresponding to a data retransmission layer is used for transferring data arrival acknowledgement information from the UE to RNC.

The next description is of three examples of quality judgment processes by the quality judgment unit 383 shown in FIG. 3 by referring to FIGS. 6 through 9. The quality judgment processes correspond to procedures 204 through 207 shown in FIG. 2B.

FIG. 6 shows judgment parameters stored by the quality judgment unit 383 and used for the quality judgment process. In this example, the parameters A through Z are all set as optional (OP).

FIG. 7 is a flow chart of a quality judgment process for judging a reception quality from reception data within a predetermined period. The quality judgment unit 383 first calculates a reception quality (i.e., a ratio of ACK reception) and its achievement ratio from the following expressions (step 701):

Reception quality=(the number of ACK receptions within a predetermined period)/(the number of samples within a predetermined period). (3)

Achievement ratio of a reception quality=(a reception quality)/(a required reception quality)*100 (4)

Then, a Target SIR is set as follows based on the achievement ratio of the reception quality:

1. No change of Target SIR in the case of: judgment value A≤achievement ratio of a reception quality≤judgment value B 2. Raise Target SIR in the case of: achievement ratio of a reception quality≤judgment value A 3. Lower Target SIR in the case of: judgment value B≤achievement ratio of a reception quality Here, the quality judgment unit compares the achievement ratio of the reception quality with the judgment value B (step 702) and, if the achievement ratio of the reception quality is equal to or lower than the judgment value B, then it compares the achievement ratio of the reception quality with the judgment value A (step 703). And, if the achievement ratio of the reception quality is equal to or greater than the judgment value A, it terminates the process without changing the Target SIR.

If the achievement ratio of the reception quality is greater than the judgment value B in the step 702 or the achievement ratio of the reception quality is smaller than the judgment value A in the step 703, then it checks whether or not change instructions for the Target SIR have been issued for a continuous C times of judgments to the same UE (step 704). If the reception quality has not improved even after a continuous C times of instructing a change of the Target SIRs, it stops a control for the aforementioned UE in order to reduce an RRC load and ends the process.

Meanwhile, if the number of instructions for changing Target SIRs has not reached the C times, it checks whether or not a judgment period of D (seconds) has passed after issuing a change instruction of the Target SIR to the UE (step 705). If the reception quality has not improved even after the judgment period of D has passed, it stops a control for the aforementioned UE in order to reduce an RRC load and terminates the process.

When a judgment period of E (seconds) has passed after stopping a control for a UE, it restarts a control for the UE.

If the judgment period of D has not passed in the step 705, the quality judgment unit changes Target SIRs (step 706). Here, in the case of the achievement ratio of the reception quality being less than the judgment value of A, it raises Target SIR X for the UE and Target SIR Y for the Node B, while in the case of the achievement ratio of the reception quality being greater than the judgment value of B, it lowers the Target SIR X for the UE and the Target SIR Y for the Node B.

It then compares the Target SIR X and the Target SIR Y and modifies these values as follows:

1. No change of the Target SIR X or Y in the case of: 0≤Target SIR X−Target SIR Y≤Z 2. Lower the Target SIR Y in the case of: Target SIR X−Target SIR Y≤0

3. Lower the Target SIR X in the case of: Z≤Target SIR X−Target SIR Y Here, the quality judgment unit compares the difference between X and Y (i.e., Target SIR X-Target SIR Y) with "0" (zero) (step 707) and, if the difference is smaller than "0", lowers the Target SIR Y (step 708).

If the difference is equal to or greater than "0", then it compares the difference with the judgment value Z (step 709) and if the difference is greater than Z, it lowers the Target SIR X (step 710). And, if the difference is equal to or smaller than Z, it does not change the Target SIR X or Y.

Then it notifies the UE and Node B of the respective values of Target SIR X and Y, thereby requesting for changing the Target SIRs (step 711).

Figure 8:
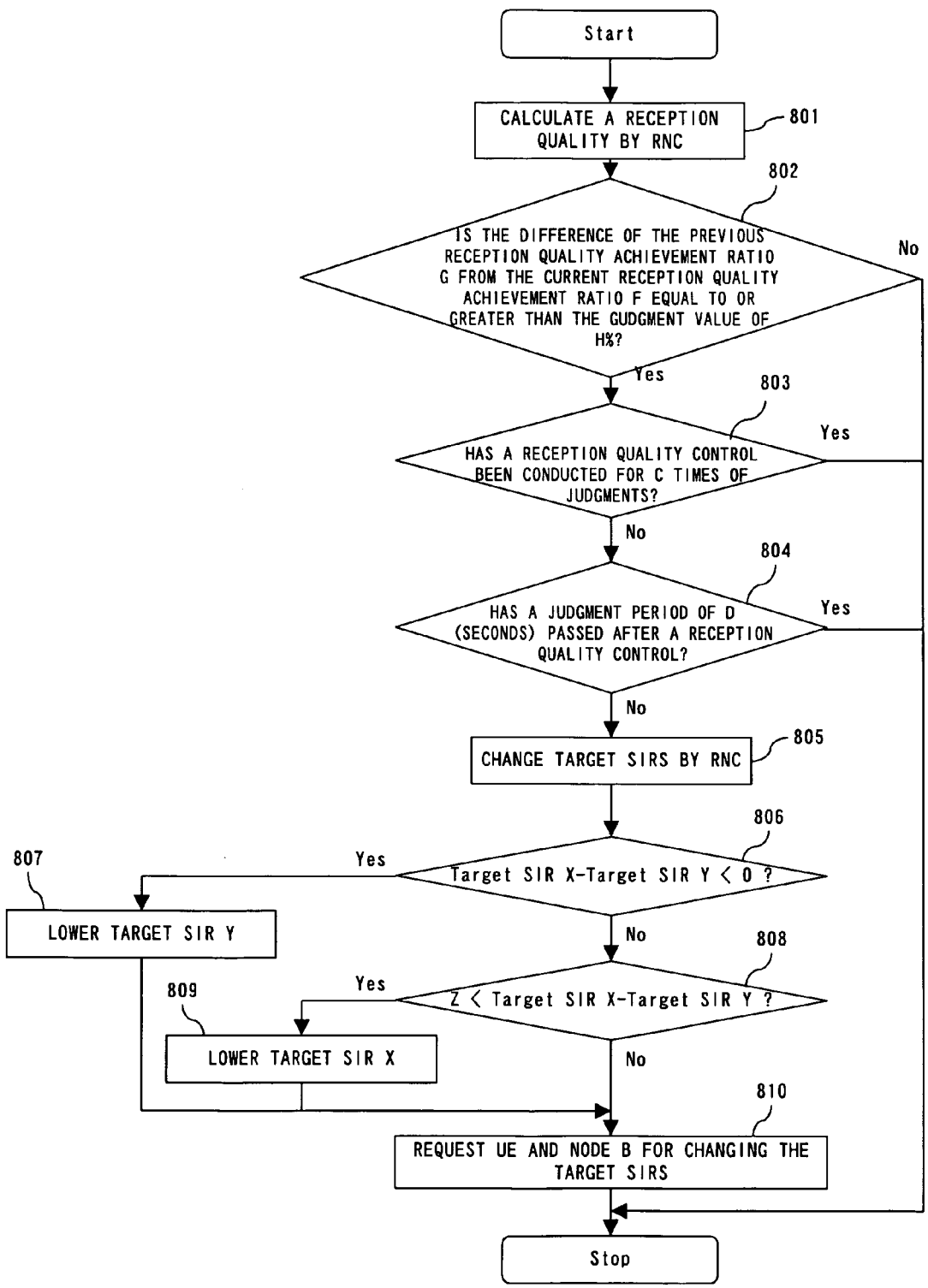
FIG. 8 is a flowchart of a second quality judgment process.

FIG. 8 is a flow chart of a quality judgment process based on the difference of achievement ratios of a reception quality. The quality judgment unit 383 first calculates a reception quality and its achievement ratio by the above described expressions (3) and (4) (step 801).

Then it calculates the difference of achievement ratio (i.e., achievement ratio G-achievement ratio F) from the currently calculated achievement ratio F (%) of a reception quality and previously calculated achievement ratio G (%) thereof for the same UE, and compares it with a judgment value of H (%) (step 802). Here, if the value of achievement ratio G-achievement ratio F is equal to or smaller than the judgment value of H, the reception quality is judged to be good and the process terminates without changing a Target SIR.

Contrarily, if the value of achievement ratio G-achievement ratio F is greater than the judgment value of H, the reception quality is judged to be degrading and it accordingly performs the processes of the step 803 and thereafter. The processes of the steps 803 and 804 are the same as those of the steps 704 and 705 shown in FIG. 7. When a judgment period of E (seconds) passes after stopping a control for the UE, another control therefore is restarted.

If a judgment period of D has not passed in the step 804, it raises the Target SIR X for the UE and the Target SIR Y for the Node B (step 805), followed by performing processes of the step 806 and thereafter. The processes of the steps 806 through 810 are the same as those of the steps 707 through 711 shown in FIG. 7.

FIG. 9 is a flow chart of a quality judgment process with judgments of FIG. 7 and those of FIG. 8 being combined. The quality judgment unit 383 first calculates a reception quality and its achievement ratio by the above described expressions (3) and (4) (step 901).

Then it performs the processes of the step 902 and thereafter. The processes of the steps 902 and 903 are the same as those of the steps 702 and 703 shown in FIG. 7, except that the currently calculated achievement ratio F (%) of a reception quality is compared with the judgment values B and A respectively in the steps 902 and 903.

If the achievement ratio F of the reception quality is equal to or greater than the judgment value A, the quality judgment unit calculates the difference of the achievement ratios (i.e., achievement ratio G-achievement ratio F) from the currently calculated achievement ratio F (%) of the reception quality and the previously calculated achievement ratio G (%) for the same UE and compares it with the judgment value of H (%) (step 904). Here, if the value of achievement ratio G-achievement ratio F is equal to or smaller than the judgment value of H, the reception quality is judged to be good and the process is terminated without changing a Target SIR.

Contrarily, if the value of achievement ratio G-achievement ratio F is greater than the judgment value of H, the reception quality is judged to be degrading and it accordingly performs the processes of the step 905 and thereafter. The processes of the steps 905 and 906 are the same as those of the steps 704 and 705 shown in FIG. 7. When a judgment period of E (seconds) passes after stopping a control for the UE, another control therefore is restarted.

If a judgment period of D has not passed in the step 906, it changes the Target SIRs (step 907). Here, if the achievement ratio F of the reception quality is smaller than the judgment value A or if the value of achievement ratio G-achievement ratio F is greater than the judgment value H, it raises the Target SIR X for the UE and the Target SIR Y for the Node B, while if the achievement ratio F of the reception quality is greater than the judgment value B, it lowers the Target SIR X for the UE and the Target SIR Y for the Node B, followed by performing the processes of the step 908 and thereafter. The processes of the steps 908 through 912 are the same as those of the steps 707 through 711 shown in FIG. 7.

Incidentally, the above described embodiment assumes an implementation with RLC retransmission protocol of the 3GPP, the present invention, however, is applicable to other data retransmission protocol including ACK/NACK check, et cetera.

FIG. 10 exemplifies a protocol structure in the case of carrying out a power control according to the present invention between a UE and an Iub network. In the protocol structure, a data retransmission layer and an L3MSG (message) layer exist as upper layers of the physical layer, in which data arrival acknowledgement information is transferred from the UE to a UE control apparatus on the network side by using the data retransmission layer.

The UE control apparatus is an apparatus having both functions of the Node B and RNC for example and directly communicates with a UE. The UE control apparatus accordingly has the same function as the quality judgment unit 383 shown in FIG. 3 and judges a quality by using information transmitted and received on the data retransmission layer.

Figure 12:
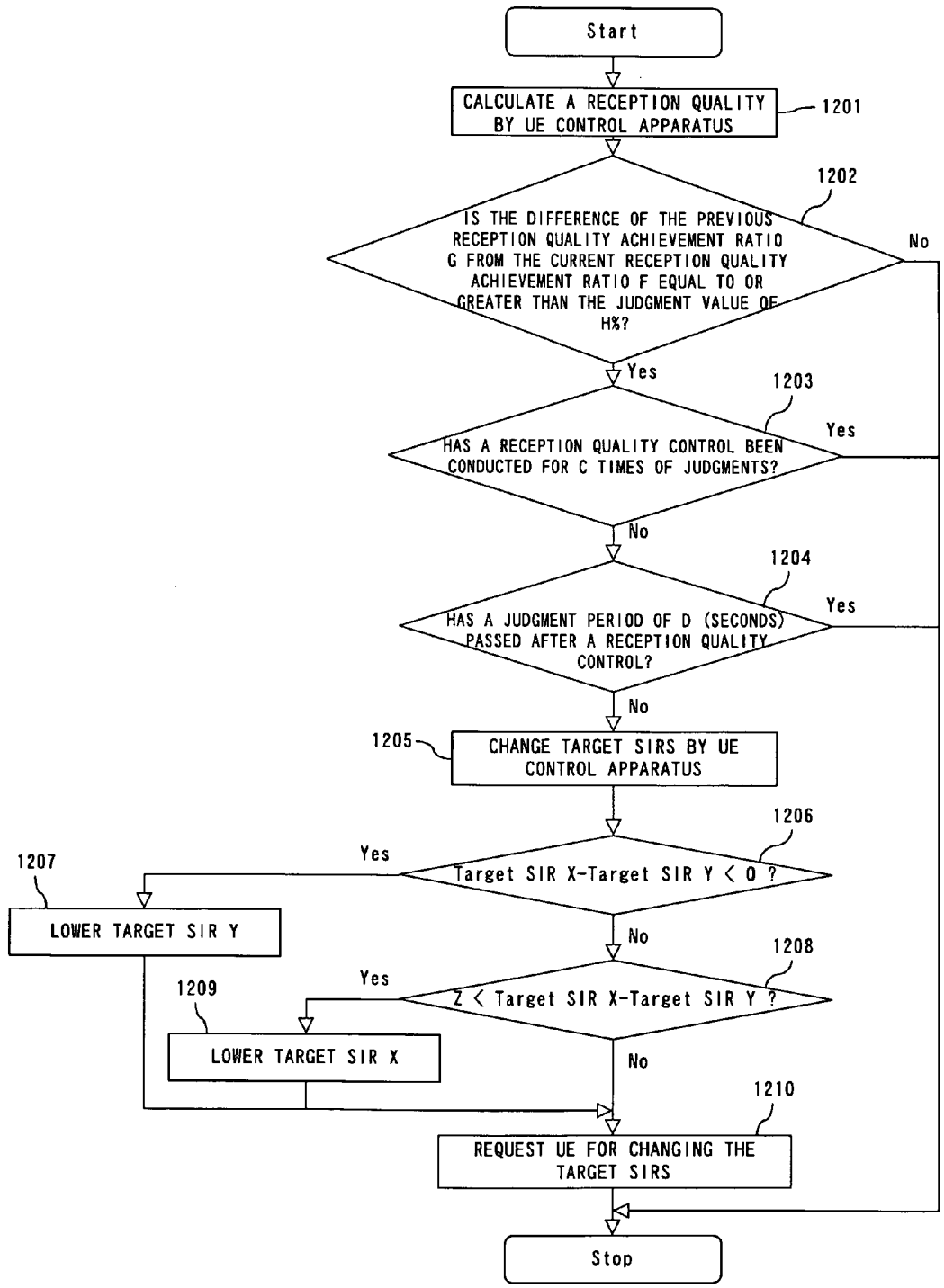
FIG. 12 is a flow chart of a fifth quality judgment process.

FIGS. 11 through 13 are flow charts exemplifying quality judgment processes by the UE control apparatus. The processes of the steps 1101 through 1111 shown by FIG. 11 are the same as those of the steps 701 through 711 shown by FIG. 7. The processes of the steps 1201 through 1210 shown by FIG. 12 are the same as those of the steps 801 through 810 shown by FIG. 8. The processes of the steps 1301 through 1312 shown by FIG. 13 are the same as those of the steps 901 through 912 shown by FIG. 9.

In FIGS. 11 through 13, if a reception quality has not improved even after issuing instructions for changing the Target SIRs continuously for C times and the reception quality has not improved when a judgment period of D has passed after issuing an instruction for changing them, the control for the UE is stopped in order to reduce a load on the data retransmission layer.

Although the present embodiment is configured so that the RNC judges the reception quality of a UE, thereby carrying out power controls for the UE and Node B, contrarily the UE conceivably judges the reception quality of the RNC, thereby carrying out power controls for the RNC and Node B. In this case, the quality judgment unit 406 shown in FIG. 4 performs the quality judgment processes shown by FIGS. 7 through 9, and the RNC, having received a notification of a change of a Target SIR from the UE, changes the Target SIR of the RNC itself to the notified value.

Likewise, in the case of a UE judging the reception quality of a UE control apparatus, thereby carrying out a power control therefore, the quality judgment unit 406 performs the quality judgment processes shown by FIGS. 11 through 13, and the UE control apparatus, having received a notification of a change of Target SIRs from the UE, changes the Target SIR of the apparatus itself to the notified value.

And in a quality judgment process, an ACK reception ratio is not necessarily required to use as a reception quality, another parameter calculated from data arrival acknowledgement information may be used instead.

Furthermore, a power control is not necessarily required to use a Target SIR as target value, another parameter indicating a power quality may be used instead.

What is claimed is:

1. A power control apparatus for controlling a power of a mobile station for use in a wireless mobile telecommunication system, the power control apparatus comprising:

a telecommunication device configured to perform data telecommunication with the mobile station and receive data arrival acknowledgement information transmitted from the mobile station in a data retransmission layer;

a judgment device configured to repeat judging a reception quality of the mobile station by using the received data arrival acknowledgement information and changing a first target power quality which is compared with a power quality measured in the mobile station and a second target power quality which is compared with a power quality measured in a base station based on a judgment result, and to stop changing the first target power quality and the second target power quality when the reception quality is not improved by previous instructions to change the first target power quality and the second target power quality; and a notification device configured to transmit the changed first target power quality to the mobile station, to request the mobile station to change the first target power quality, to transmit the changed second target power quality to the base station, and to request the base station to change the second target power quality, wherein said judgment device calculates a first indicator of said reception quality by using first data arrival acknowledgement information previously received from the mobile station, calculates a second indicator of the reception quality by using second data arrival acknowledgement information presently received from the mobile station and compares a difference between the first and second indicators with a judgment value, thereby judging the reception quality.

2. The power control apparatus according to claim 1, wherein said judgment device further compares the calculated second indicator with a judgment value, thereby judging the reception quality.

3. A power control method for controlling a power of a mobile station for use in a wireless mobile telecommunication system, the power control method comprising:

performing data telecommunication with the mobile station and receiving data arrival acknowledgement information transmitted from the mobile station in a data retransmission layer;

repeating to judge a reception quality of the mobile station by using the received data arrival acknowledgement information and to change a first target power quality which is compared with a power quality measured in the mobile station and a second target power quality which is compared with a power quality measured in a base station based on a judgment result;

transmitting the changed first target power quality to the mobile station and requesting the mobile station to change the first target power quality;

transmitting the changed second target power quality to the base station and requesting the base station to change the second target power quality; and stopping to change the first target power quality and the second target power quality when the reception quality is not improved by previous instructions to change the first target power quality and the second target power quality, wherein said repeating to judge the reception quality includes calculating a first indicator of said reception quality by using first data arrival acknowledgement information previously received from the mobile station, calculating a second indicator of the reception quality by using second data arrival acknowledgement information presently received from the mobile station and comparing a difference between the first and second indicators with a judgment value, thereby judging the reception quality.

4. A power control apparatus for controlling a power of a mobile station for use in a wireless mobile telecommunication system, the power control apparatus comprising:

telecommunication means for performing a data telecommunication with the mobile station and receiving data arrival acknowledgement information transmitted from the mobile station in a data retransmission layer;

judgment means for repeating to judge a reception quality of the mobile station by using the received data arrival acknowledgement information and to change a first target power quality which is compared with a power quality measured in the mobile station and a second target power quality which is compared with a power quality measured in a base station based on a judgment result, and for stopping to change the first target power quality and the second target power quality when the reception quality is not improved by previous instructions to change the first target power quality and the second target power quality; and notification means for transmitting the changed first target power quality to the mobile station, for requesting the mobile station to change the first target power quality, for transmitting the changed second target power quality to the base station, and for requesting the base station to change the second target power quality, wherein said judgment means calculates a first indicator of said reception quality by using first data arrival acknowledgement information previously received from the mobile station, calculates a second indicator of the reception quality by using second data arrival acknowledgement information presently received from the mobile station and compares a difference between the first and second indicators with a judgment value, thereby judging the reception quality.

* * * * *